United States Patent
Schauls

(10) Patent No.: US 6,554,691 B1
(45) Date of Patent: Apr. 29, 2003

(54) FISH CLEANING STATION

(76) Inventor: Dennis Schauls, 28016 NE 153rd Pl., Duvall, WA (US) 98019

( * ) Notice: Subject to any disclaimer, the term of this patent is extended or adjusted under 35 U.S.C. 154(b) by 0 days.

(21) Appl. No.: 10/068,145

(22) Filed: Feb. 6, 2002

(51) Int. Cl.[7] .............................................. A22C 25/06
(52) U.S. Cl. ...................................................... 452/194
(58) Field of Search ................................ 452/185, 194, 452/195; 43/65, 21.2, 25; 119/28.5

(56) References Cited

U.S. PATENT DOCUMENTS

| | | | | |
|---|---|---|---|---|
| 1,820,284 A | * | 8/1931 | Mills ........................... | 119/28.5 |
| 2,499,103 A | * | 2/1950 | Love ............................ | 119/28.5 |
| 3,561,043 A | | 2/1971 | Breckenridge et al. ....... | 17/53 |
| 3,590,423 A | | 7/1971 | Messer ......................... | 17/53 |
| 3,668,739 A | | 6/1972 | Lewis ........................... | 17/53 |
| 4,445,459 A | * | 5/1984 | Julie ............................. | 119/28.5 |
| 4,454,628 A | * | 6/1984 | Olson ........................... | 452/194 |
| 5,098,338 A | | 3/1992 | Jensen ......................... | 452/194 |
| 5,161,484 A | * | 11/1992 | Duane ......................... | 119/28.5 |
| 5,509,373 A | * | 4/1996 | Elesh ........................... | 119/28.5 |
| 5,709,164 A | * | 1/1998 | Batterton ..................... | 119/28.5 |
| 5,785,003 A | * | 7/1998 | Jacobson et al. ........... | 119/28.5 |
| 5,992,348 A | * | 11/1999 | Harding ....................... | 119/28.5 |

* cited by examiner

*Primary Examiner*—Thomas Price
(74) *Attorney, Agent, or Firm*—Dean A. Craine

(57) ABSTRACT

A compact, light-weight, portable fish cleaning station which can be easily and selectively mounted on the outside surface of the hull of a small boat. The station is used to securely hold a fish for cleaning or cutting while allowing drainage of waste material into the water. The station includes a rigid frame with a suspended net located inside the frame, a pair of support arms that are temporarily aligned over the gunwale of the hull and securely clamped in position. The distal ends of the support arms are inserted into rigid tubes attached to the end members on frame. The length of the support arms is sufficient so that the station may be used on hulls with different sidewalls. The net is suspended in the frame with clips that allow the net to flex when used and allows the net to be easily replaced. The net also securely holds the fish as it is being cut.

2 Claims, 2 Drawing Sheets

FISH CLEANING STATION

BACKGROUND OF THE INVENTION

1. Field of the Invention

This invention relates to devices used to clean fish and, more particularly, to devices used to clean fish which can be removably mounted over the sides of a boat.

2. Description of the Related Art

Fishermen often find it desirable to clean their fish on board their boats. Fish cleaning devices that permanently or temporarily attach to the side of the hull to hold the fish in a suspended position outside of the boat have been known for several years.

For example, U.S. Pat. No. 3,561,043 (Breckenridge) discloses a boat-mounted holder for cleaning fish that includes a rigid trough held over the outside surface of the hull by a horizontal flange that extends over the outer edge of the gunwale. Two flexible cords are attached to the flange that extends over the gunwale to temporarily hold the trough over the outside surface of the hull. Hooks are attached to the end of the cords that engage the lower inside edge of the hull.

U.S. Pat. No. 3,668,739 (Lewis) discloses a rigid fish-cleaning trough mounted to the outside surface of the hull using two "C" clamps that extend over the gunwale, and attach to the inside surface of the hull.

U.S. Pat. No. 5,098,338 (Jensen) discloses a portable fish cleaner that includes a folding V-shaped trough that temporarily holds a fish in a suspended position over the outside surface of a boat. The trough is opened at its opposite ends which allows the fish waste to be washed into the water. The trough is supported by two support members that attach to clips permanently mounted on the outside surface of the boat to hold the trough in a suspended position over the outside surface of the hull.

One drawback with some fish cleaners found in the prior art is that they use troughs made of metal that can scratch or damage the sides of the hull. Because the troughs are relatively large structures that hang over the sides of the hull, waves often impact them causing them to disengage or causing damage to the hull. Another drawback is that because the troughs are relatively deep and narrow, they may block or impede the ability to cut through the fish with a knife. A still further drawback is that the surfaces on the trough are smooth and become slippery when wet thereby enabling the fish to move inside the trough when cutting longitudinally.

What is needed is a portable fish cleaning station that can be stored in a compact configuration on the boat and easily assembled. What is also needed is a fish cleaning station that can be selectively suspended over different gunwales widths without permanently modifying or attaching hardware to the hull. What is needed is a fish cleaning station that does not use a trough to hold the fish yet allows fish waste to be easily and quickly discarded into the water.

SUMMARY OF THE INVENTION

The above-stated needs are met by the fish cleaning station disclosed herein which comprises a horizontally aligned net suspended inside a rigid, rectangular frame temporarily mounted over the side of a hull. The frame includes a plurality of connectors, such as split rings or snap hooks, that are evenly spaced along the two side members of the frame and connect to the adjacent edges of the net to hold the net in a relatively taut, suspended position inside the frame. Attached to each end frame member is a rigid tube designed to slidingly receive a support arm on an adjustable clamp assembly that selectively attaches to the inside surface of the hull.

Each adjustable clamp assembly includes a support arm and an adjustable clamping member. During use, the support arm is transversely aligned over the top surface of the gunwale so that the adjustable clamping member is disposed on the inside surface of the hull. The adjustable clamping member is then selectively adjusted to engage a recessed edge or surface located on the inside surface of the hull. Once both adjustable clamp assemblies are attached to the hull, the distal end of each support arm is inserted into the rigid tube on the frame. A stop means is provided on the distal end of each support arm to prevent the support arm from accidentally disengaging from the rigid tube. The support arm is sufficient in length to extend over different size gunwales and still hold the frame in a suspended position from the hull.

The net is stretched across the inside area of the frame. During use, the net holds the fish in a substantially horizontal position on the side of the hull with no structures that may block or impede cutting through the fish with a knife. The net also partially conforms to the general shape of a fish deposited thereon and includes openings through which the fish's gills, fins and other structures may partially extend through to prevent the fish from moving longitudinally on the net. The net also allows water and fish waste to pass through for easy cleaning and high wave action.

DESCRIPTION OF THE PREFERRED EMBODIMENT(S)

Figure 1:
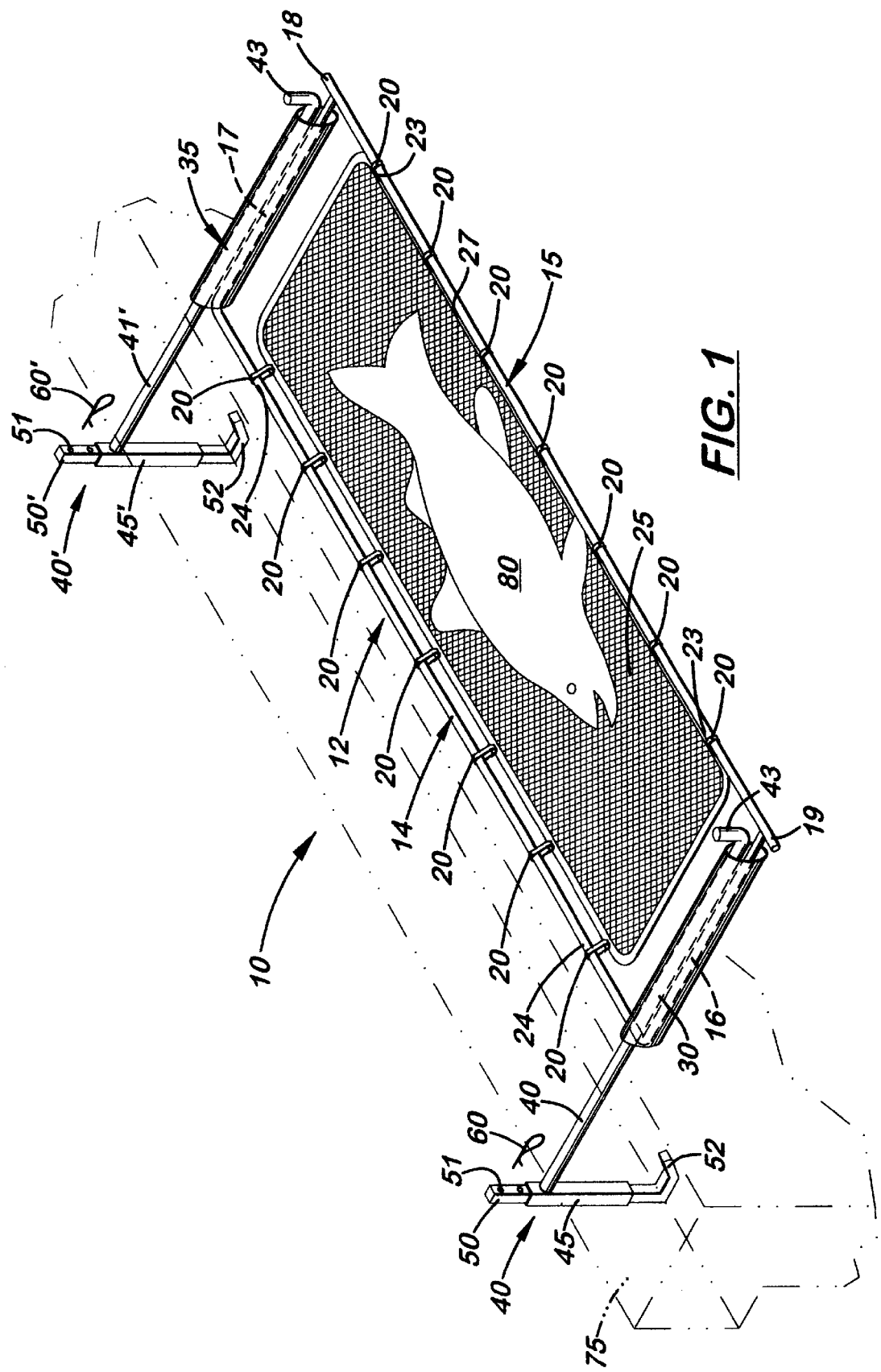
FIG. 1 is perspective view of the fish cleaning station.
Figure 2:
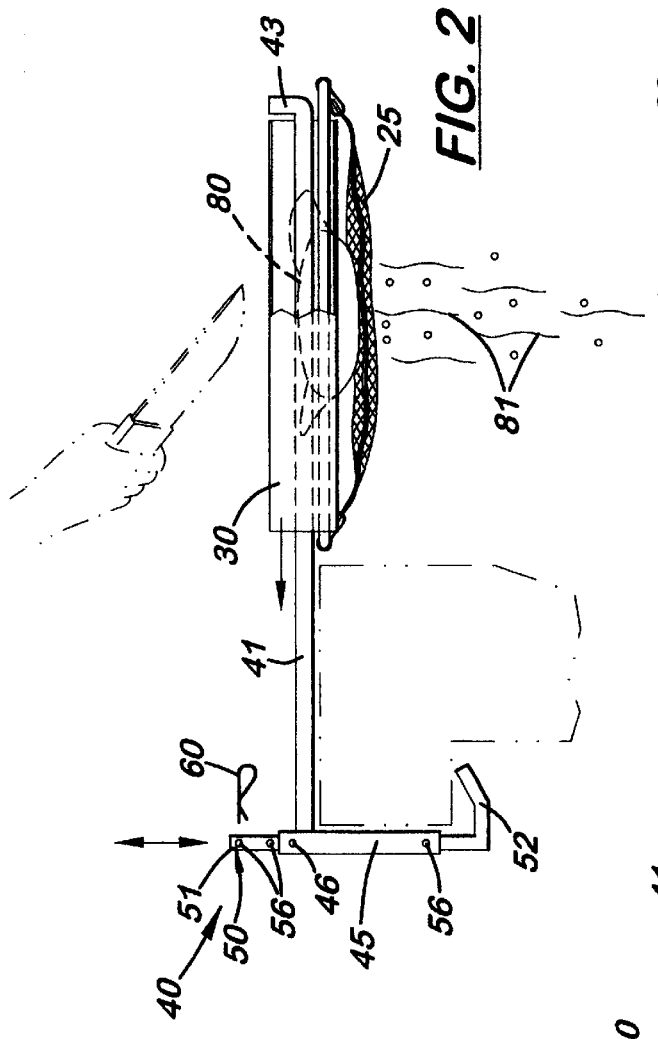
FIG. 2 is a side elevational view of the fish cleaning station attached to the side of a hull.
Figure 5:
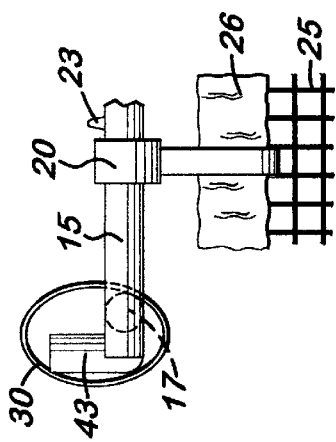
FIG. 5 is a front elevational view of one corner of the cleaning station showing the relative position of the rigid tube and the end and side frame members.
Figure 4:
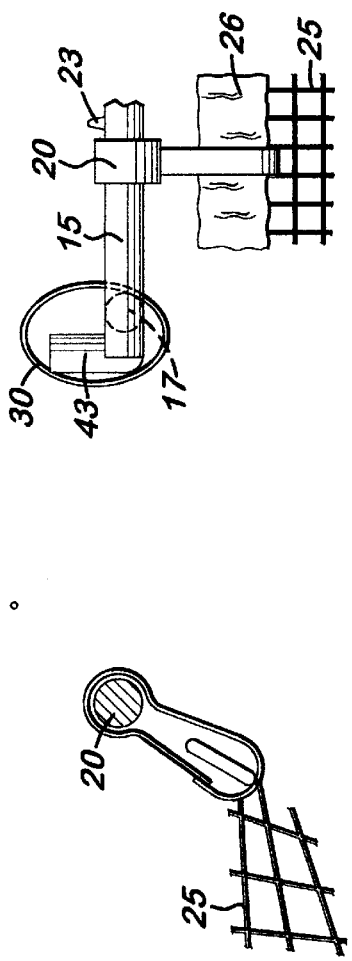
FIG. 4 is a side elevational view of the clips used to attach the net to the frame.

Referring now to FIGS. 1–5, there is shown and described a portable, light-weight fish cleaning station 10 which attaches to the outside surface of the hull 75 of a boat and is used to clean fish 80 while allowing the fish waste 81 to drain into the water. The device 10 comprises a rigid, rectangular frame 12, formed of metal, round bars or plastic tubing material having two opposite side members 14, 15, and two opposite end members 16, 17. Formed on the ends of the outer side member 15 are extensions 18, 19 that act as stop surfaces for the distal ends of the support arms 41, 41', respectively, discussed further below.

A rectangular net 25, with dimensions roughly matching those of the frame 12 is disposed inside the frame 12. The net 25 is made of pliable material such as nylon netting with ⅛ inch to ¼ inch net openings 28 formed therein. The perimeter edge of the net 25 is covered with binding 26 to prevent fraying. During assembly, the net 25 is stretched, longitudinally aligned, and connected inside the frame 12 with sliding connectors 20. In the preferred embodiment, a plurality of sliding connectors 20, such as split rings or snap hooks, is evenly spaced along the two side members 14, 15. Formed on the top surface on opposite ends of the side members 14, 15 are raised projections 23, 24 used to prevent the movement of the last sliding connector 20 away from the ends members 16, 17, respectively.

Figure 3:
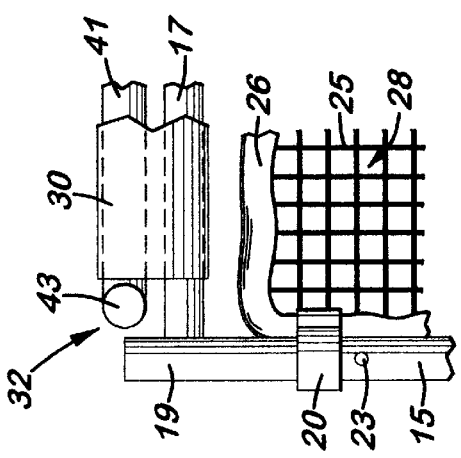
FIG. 3 is a top plan view of the corner of the frame and net.

Attached and longitudinally aligned with each end member 16, 17 is an elongated rigid tube 30, 35. Each rigid tube 30, 35 is hollow and designed to receive the distal end of each support arm 41, 41', respectively. In the preferred embodiment, each rigid tube 30, 35 is slightly shorter in length than the adjacent end member 16, 17 so that a gap 32, as shown in FIG. 3, is formed between the distal ends of the rigid tubes 30, 35 and the extensions 18, 19.

As stated above, two adjustable clamp assemblies 40, 40' are used to temporarily mount the frame 12 to the hull 75. In the preferred embodiment, each adjustable clamp assembly 40 includes support arms 41, 41' with perpendicularly aligned sleeve members 45, 45'. The sleeve members 45, 45' are hollow and designed to receive clamp members 50, 50'. Formed on the distal end of the support arms 41, 41' are upward extending lips 43, 43'. The lips 43, 43' have sufficient length so that the distal ends of the support arms 41, 41' may freely slide into the rigid tubes 30, 35. When the distal ends of the support arms 41, 41' are placed inside the rigid tubes 30, 35 the lips 43, 43' force the rigid tubes 30, 35 upward so that the support arms 41, 41' may slide freely therein. When the lips 43, 43' extend from the distal ends of the rigid tubes 30, 35 the rigid tubes 30, 35 fall downward and the lips 43, 43' and distal ends of the support arms 41, 41' are disposed inside the gaps 32 formed between the distal ends of the rigid tubes 30, 35 and the extensions 18, 19. The lips 43, 43' extend upward and prevent the rigid tubes 30, 35 from sliding off the distal ends of the support arms 41, 41'.

During assembly, a clamp member 50, 50' is disposed inside the sleeve members 45, 45'. In the preferred embodiment, the clamp members 50, 50' include straight long legs 51, 51' that slide freely inside the sleeve members 45, 45' and a diagonally aligned short leg 52. The short leg 52 may be slightly curved or straight. Formed near the lower end of the sleeve member 45 is one transversely aligned bore 56. Formed on the upper end of the long leg 51 is a plurality of transversely aligned bores 56. During use, the clamp member 50 is adjusted inside the sleeve member 45 so that the short leg 52 engages a surface formed on the inside surface of the hull 75. A pin 60, 60' is inserted into one of a plurality of bores 56 or bore 46 formed on the clamp member 50 to hold the clamp member 50 in the desired position.

In the preferred embodiment, the frame 12 is made of tubing or round stock approximately ⅛ inch in diameter. The side members 14, 15 are each approximately 35 inches in length. Each extension 18, 19 on the side member 15 is approximately 1 inch in length. The end members 16, 17 each measure approximately 7 inches in length and the rigid tubes 30, 35, each measure 6-½ inches in length and ¾ inch in height and width. The net 25 measures approximately 34 inches in length and 7 ½ inches in width. The support members 41, 41' each measure approximately 15 inches in length with a diameter of approximately ¼ inch. The sleeve member 45 is square in cross-section and measures approximately 3-¼ inches in length with an inside diameter of approximately ½ inch. The long leg 51 and short leg 52 on the clamp member 50 measures approximately 5 inches and 2 inches in length, respectively, with a diameter of approximately ⅜ inch.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A fish cleaning station, comprising:

a. a rectangular frame having two long side members and two end members;

b. a net disposed inside said frame and supported by said side members, said net having a plurality of net openings sufficient in size to allow fish waste to pass through;

c. a plurality of connectors to selectively attach said net to said frame;

d. a tube longitudinally aligned and attached to each said end member on said frame;

e. a support arm that extends over the a hull of a boat and slides into said tube attached to each said end member to hold said frame in a suspended position from a hull; and, f. an adjustable clamp means connected to each said support arm which selectively holds said support arm on a hull.

2. The fish cleaning station, as recited in claim 1, wherein said adjustable clamp means includes a tubular member perpendicularly aligned and attached to the proximal end of each said support member, a sliding clamp member that moves longitudinally inside said tubular member, and a pin that locks said sliding clamp member in position in said tubular member.

* * * * *